US009914088B2

(12) United States Patent
Tanaka et al.

(10) Patent No.: US 9,914,088 B2
(45) Date of Patent: Mar. 13, 2018

(54) $CO_2$ RECOVERY UNIT AND $CO_2$ RECOVERY METHOD

(71) Applicants: MITSUBISHI HEAVY INDUSTRIES, LTD., Tokyo (JP); THE KANSAI ELECTRIC POWER CO., INC., Osaka-shi, Osaka (JP)

(72) Inventors: Hiroshi Tanaka, Tokyo (JP); Hiromitsu Nagayasu, Tokyo (JP); Takuya Hirata, Tokyo (JP); Tsuyoshi Oishi, Tokyo (JP); Takashi Kamijo, Tokyo (JP)

(73) Assignees: MITSUBISHI HEAVY INDUSTRIES, LTD., Tokyo (JP); THE KANSAI ELECTRIC POWER CO., INC., Osaka-shi (JP)

( * ) Notice: Subject to any disclaimer, the term of this patent is extended or adjusted under 35 U.S.C. 154(b) by 267 days.

(21) Appl. No.: 14/409,889

(22) PCT Filed: May 29, 2013

(86) PCT No.: PCT/JP2013/064925
§ 371 (c)(1),
(2) Date: Dec. 19, 2014

(87) PCT Pub. No.: WO2014/024548
PCT Pub. Date: Feb. 13, 2014

(65) Prior Publication Data
US 2015/0182906 A1    Jul. 2, 2015

(30) Foreign Application Priority Data

Aug. 8, 2012  (JP) ................................ 2012-176131

(51) Int. Cl.
*B01D 53/14*   (2006.01)
*B01D 53/18*   (2006.01)
(Continued)

(52) U.S. Cl.
CPC ..... *B01D 53/1425* (2013.01); *B01D 53/1475* (2013.01); *B01D 53/18* (2013.01);
(Continued)

(58) Field of Classification Search
CPC ........ B01D 2252/103; B01D 2252/204; B01D 2258/0283; B01D 53/1425;
(Continued)

(56) References Cited

U.S. PATENT DOCUMENTS 5,378,442 A   1/1995  Fujii et al.
6,784,320 B2  8/2004  Mimura et al.
(Continued)

FOREIGN PATENT DOCUMENTS

EP   0553643 A2   8/1993
EP   1334759 A1   8/2003
(Continued)

OTHER PUBLICATIONS

International Search Report dated Jul. 9, 2013 issued in corresponding application No. PCT/JP2013/064925.
(Continued)

*Primary Examiner* — Cabrena Holecek
(74) *Attorney, Agent, or Firm* — Westerman, Hattori, Daniels & Adrian, LLP

(57) ABSTRACT

A $CO_2$ recovery unit for recovery and removal of $CO_2$ in a $CO_2$-containing flue gas using a $CO_2$-absorbent within a $CO_2$ absorber is provided. The $CO_2$ absorber includes a $CO_2$-absorbing unit for the absorption of $CO_2$ in a $CO_2$-containing flue gas, a main water rinsing unit that is provided on a gas flow downstream side of the $CO_2$-absorbing unit and that uses rinsing water to recover the accompanying $CO_2$-absorbent while cooling decarbonated flue gas, and a preliminary water rinsing unit provided between the $CO_2$-absorbing unit and the main water rinsing unit. A portion of
(Continued)

the rinsing water containing the $CO_2$-absorbent that is circulated in the main water rinsing unit is withdrawn and is subjected to preliminary water rinsing in the preliminary water rinsing unit. The preliminary rinsing water is allowed to meet with a $CO_2$-absorbent while allowing the rinsing water to directly flow down on the $CO_2$-absorbing unit side.

5 Claims, 5 Drawing Sheets

(51) Int. Cl.
    *B01D 53/62* (2006.01)
    *B01D 53/78* (2006.01)
    *C01B 32/50* (2017.01)

(52) U.S. Cl.
    CPC ............ *B01D 53/62* (2013.01); *B01D 53/78* (2013.01); *C01B 32/50* (2017.08); *B01D 2252/204* (2013.01); *B01D 2258/0283* (2013.01); *Y02C 10/04* (2013.01); *Y02C 10/06* (2013.01); *Y02P 20/152* (2015.11)

(58) Field of Classification Search
    CPC ................. B01D 53/1475; B01D 53/1493; B01D 53/18; B01D 53/62; B01D 53/78; C01B 31/20; Y02C 10/04; Y02C 10/06; Y02P 20/152
    See application file for complete search history.

(56) References Cited

U.S. PATENT DOCUMENTS

| | | | |
|---|---|---|---|
| 7,316,737 B2 | 1/2008 | Mimura et al. | |
| 8,529,857 B2 * | 9/2013 | Sieder ................ | B01D 53/1406 423/228 |
| 2003/0045756 A1 | 3/2003 | Mimura et al. | |
| 2004/0092774 A1 * | 5/2004 | Mimura ............. | B01D 53/1475 564/497 |
| 2011/0158891 A1 * | 6/2011 | Nagayasu .......... | B01D 53/1418 423/437.1 |
| 2011/0168020 A1 | 7/2011 | Baburao et al. | |
| 2013/0164203 A1 | 6/2013 | Nagayasu et al. | |
| 2014/0013945 A1 | 1/2014 | Tanaka et al. | |
| 2015/0241059 A1 * | 8/2015 | Oishi ................. | B01D 53/1475 423/220 |

FOREIGN PATENT DOCUMENTS

| | | |
|---|---|---|
| EP | 2338583 A2 | 6/2011 |
| EP | 2 691 163 A1 | 2/2014 |
| JP | 05-184867 A | 7/1993 |
| JP | 5-245340 A | 9/1993 |
| JP | 8-80421 A | 3/1996 |
| JP | 2002-126439 A | 5/2002 |
| JP | 2007-284272 A | 11/2007 |
| JP | 2011/115724 A | 6/2011 |
| JP | 2011-136258 A | 7/2011 |
| JP | 2012-500713 A | 1/2012 |
| JP | 2012-236166 A | 12/2012 |
| WO | 02/34369 A1 | 5/2002 |

OTHER PUBLICATIONS

Written Opinion of the International Searching Authority dated Jul. 9, 2013 issued in corresponding application No. PCT/JP2013/064925.
English Translation of Written Opinion dated Jul. 9, 2013, issued in corresponding International Application No. PCT/JP2013/064925 (8 pages).
Extended (Supplementary) European Search Report (EESR) dated Feb. 25, 2016, issued in European Patent Application No. 13828178.7. (9 pages).
Notice of Acceptance dated Feb. 22, 2016, issued in Australian Patent Application No. 2013300927. (3 pages).
Office Action dated Feb. 23, 2016, issued in counterpart Japanese Patent Application No. 2012-176131, with English translation. (15 pages).
Decision to Grant a Patent dated Aug. 9, 2016, issued in counterpart Japanese Patent Application No. 2012-176131 with English translation. (4 pages).
Notice of Allowance dated Sep. 28, 2016, issued in counterpart Canadian Application No. 2,877,926. (1 page).
Office Action dated May 18, 2017, issued in counterpart European Patent Application No. 13828178.7. (4 pages).

* cited by examiner

$CO_2$ RECOVERY UNIT AND $CO_2$ RECOVERY METHOD

FIELD

The present invention relates to a $CO_2$ recovery unit and a $CO_2$ recovery method that reduce the concentration of basic amine compounds which remain in and are released from a decarbonated flue gas from which $CO_2$ has been removed by contact with an absorbent.

BACKGROUND

The greenhouse effect of $CO_2$ has been pointed out as a cause of global warming, and there is a pressing need to take a measure against the greenhouse effect internationally from the viewpoint of saving the global environment. $CO_2$ emission sources include various fields of human activity where fossil fuels are burned, and there is a tendency towards an ever-increasing demand for the suppression of $CO_2$ emissions. This has led to an energetic study on a method, for power generation facilities such as thermal power plants and the like that use a large amount of fossil fuels, that includes bringing a flue gas from boilers into contact with an amine-based absorbent such as an aqueous amine compound solution to remove and recover $CO_2$ from the flue gas.

When $CO_2$ is recovered using the absorbent from the flue gas, amine compounds disadvantageously accompany a decarbonated flue gas from which $CO_2$ has been recovered. The amount of the amine compound released together with the decarbonated flue gas should be reduced from the viewpoint of preventing the occurrence of air pollution from amine compounds.

Patent Literature 1 discloses a conventional method that provides a water rinsing unit in a plurality of stages that recover amine compounds accompanying a decarbonated flue gas by subjecting a decarbonated flue gas, from which $CO_2$ has been absorbed and removed by gas-liquid contact with an absorbent, to gas-liquid contact with rinsing water, and successively performing treatment for the recovery of amine compounds accompanying the decarbonated flue gas in the water rinsing unit in the plurality of stages. The rinsing water used in Patent Literature 1 is condensed water obtained by condensing and separating the water contained in $CO_2$ in such a treatment that $CO_2$ is removed from an amine-based absorbent with $CO_2$ absorbed therein to regenerate the amine-based absorbent.

Patent Literature 2 discloses a conventional apparatus that includes a cooling unit that cools a decarbonated flue gas from which $CO_2$ has been absorbed and removed by gas-liquid contact with an absorbent, and a contact unit that allows condensed water obtained by condensation in the cooling unit to be brought into countercurrent contact with the decarbonated flue gas. Further, Patent Literature 2 discloses an apparatus including a water rinsing unit that allows a decarbonated flue gas, from which $CO_2$ has been absorbed and removed by gas-liquid contact with an absorbent, to be brought into gas-liquid contact with rising water to recover amine compounds accompanying the decarbonated flue gas. The rinsing water is condensed water obtained by condensation in a cooling tower that cools a flue gas before the recovery of $CO_2$.

CITATION LIST

Patent Literature

Patent Literature 1: Japanese Laid-open Patent Publication No. 2002-126439

Patent Literature 2: Japanese Laid-open Patent Publication No. 8-80421

SUMMARY

Technical Problem

In recent years, however, a further reduction in the concentration of components in an absorbent that remain in and are released from a decarbonated flue gas is desired from the viewpoint of environmental preservation. In particular, when a $CO_2$ recovery unit is installed for a flue gas emitted from thermal power plants and the like, in which the amount of mass gas flow to be treated is expected to be large in the future, the amount of the flue gas emitted is so large that the amount of absorbent components that remain in and are released from the decarbonated flue gas is likely to be increased. Therefore, it necessary to further reduce the concentration of basic amine compounds (absorbent components) released.

An object of the present invention is to solve the above problems and to provide a $CO_2$ recovery unit and a $CO_2$ recovery method that can further reduce the concentration of basic amine compounds which remain in and are released from a decarbonated flue gas.

Solution to Problem

According to a first aspect of the present invention in order to solve the above problems, there is provided a $CO_2$ recovery unit including: a $CO_2$ absorber configured to bring a $CO_2$-containing flue gas containing $CO_2$ into contact with a $CO_2$-absorbent to remove $CO_2$; and a $CO_2$-absorbent regenerator configured to separate $CO_2$ from the $CO_2$-absorbent that has absorbed $CO_2$ therein and to regenerate the $CO_2$-absorbent; a lean solution obtained by removing $CO_2$ in the absorbent regenerator being reutilized in the $CO_2$ absorber, wherein the $CO_2$ absorber including: a $CO_2$-absorbing unit that absorbs $CO_2$ in a $CO_2$-containing flue gas with the $CO_2$-absorbent; a main water rinsing unit that is provided on a gas flow downstream side of the $CO_2$-absorbing unit and that uses rinsing water to recover the accompanying $CO_2$-absorbent while cooling decarbonated flue gas; a circulation line that supplies the rinsing water containing the $CO_2$-absorbent recovered in a liquid reservoir in the main water rinsing unit from a top portion side in the main water rinsing unit, and circulates the rinsing water; and a preliminary water rinsing unit provided between the $CO_2$-absorbing unit and the main water rinsing unit, and the $CO_2$ recovery unit being configured to: withdraw a portion of the rinsing water containing the $CO_2$-absorbent from the main water rinsing unit, supply the portion of the rinsing water into the preliminary water rinsing unit from the main water rinsing unit side to preliminarily rinse the $CO_2$-absorbent that contains $CO_2$ absorbed in the $CO_2$-absorbing unit and accompanies the flue gas, and recover the $CO_2$-absorbent; and allow the preliminary rinsing water obtained by the preliminary rinsing to directly flow down on the $CO_2$-absorbing unit side.

According to a second aspect of the present invention, there is provided the $CO_2$ recovery unit according to the first aspect, further including a cooling unit that cools a portion of the withdrawn rinsing water.

According to a third aspect of the present invention, there is provided the $CO_2$ recovery unit according to the first or second aspect, further including a finish water rinsing unit that is provided on a rear stage side of gas flow in the main water rinsing unit, for finish rinsing with the rinsing water supplied from the outside of the main water rinsing unit.

According to a fourth aspect of the present invention, there is provided the $CO_2$ recovery unit according to any one of the first to third aspects, further including a concentration unit that removes a volatile substance contained in a portion of the rinsing water withdrawn from the main water rinsing unit, wherein concentrated water from which the volatile substance has been removed is supplied, as rinsing water, into the preliminary water rinsing unit.

According to a fifth aspect of the present invention, there is provided the $CO_2$ recovery unit according to any one of the first to fourth aspects, wherein the main water rinsing unit is provided in a plurality of stages.

According to a sixth aspect of the present invention, there is provided a method for recovering $CO_2$, using a $CO_2$ absorber configured to bring a $CO_2$-containing flue gas containing $CO_2$ into contact with a $CO_2$-absorbent to remove $CO_2$, and a $CO_2$-absorbent regenerator configured to separate $CO_2$ from the $CO_2$-absorbent that absorbs $CO_2$ and to regenerate the $CO_2$-absorbent, a lean solution obtained by removing $CO_2$ in the absorbent regenerator being reutilized in the $CO_2$ absorber, the method including: cooling a $CO_2$-removed flue gas with rinsing water on a rear flow side of the $CO_2$ absorber and withdrawing a portion of rinsing water in the main water rinsing unit that recovers the accompanied $CO_2$-absorbent; subjecting the $CO_2$-removed flue gas after the recovery of $CO_2$ on a former stage side of the main water rinsing unit to preliminarily rinsing; and allowing the preliminary rinsing water used in the preliminary water rinsing to directly flow down on the $CO_2$-absorbing unit side and to meet with the $CO_2$-absorbent.

According to a seventh aspect of the present invention, there is provided the method for recovering $CO_2$ according to the sixth aspect, wherein finish rinsing is carried out with finish rinsing water supplied from the outside of the water rinsing unit on the rear flow side of the main water rinsing unit.

According to a seventh aspect of the present invention, there is provided the method for recovering $CO_2$ according to the sixth or seventh aspect, wherein a portion of the rinsing water in the main water rinsing unit is withdrawn, a volatile substance in the withdrawn rinsing water is removed from the rinsing water for concentration to give concentrated water, and the concentrated water is used as rinsing water for preliminary rinsing.

Advantageous Effects of Invention

The present invention can further reduce the concentration of basic amine compounds of an absorbent that remain in and are released from a decarbonated flue gas, and the recovered absorbent can be reutilized.

DESCRIPTION OF EMBODIMENTS

The present invention will be described in detail with reference to the accompanying drawings. However, it should be noted that the present invention is not limited to the described embodiments of the present invention and. When there is a plurality of embodiments, a combination of the embodiments is embraced in the scope of the present invention. Constituent elements in the following embodiments include those that can easily be contemplated by a person having ordinary skill in the art or those that are substantially identical to each other.

First Embodiment

Figure 1:
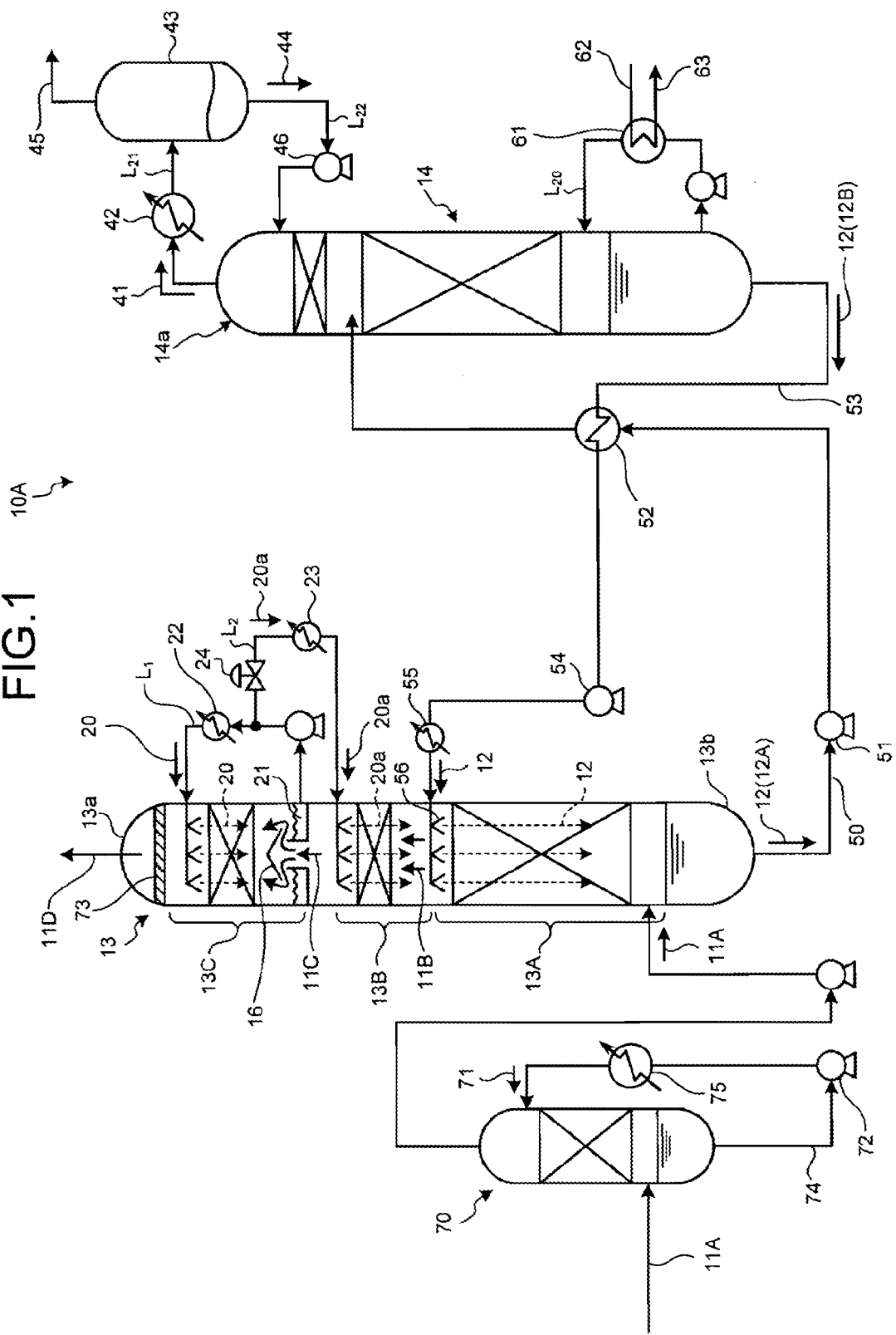
FIG. 1 is a schematic view of a $CO_2$ recovery unit according to a first embodiment.

A $CO_2$ recovery unit according to an embodiment of the present invention will be described with reference to the accompanying drawings. FIG. 1 is a schematic view of a $CO_2$ recovery unit in a first embodiment.

As illustrated in FIG. 1, a $CO_2$ recovery unit 10A in the first embodiment includes a $CO_2$ absorber (hereinafter referred to as "absorber") 13 that allows a $CO_2$-containing flue gas 11A containing $CO_2$ to be brought into contact with a $CO_2$-absorbent (a lean solution 12B) to remove $CO_2$, and an absorbent regenerator 14 that regenerates a $CO_2$-absorbent with $CO_2$ absorbed therein (a rich solution 12A), wherein the lean solution 12B from which $CO_2$ has been removed in the absorbent regenerator (hereinafter referred to as "regenerator") 14 is reutilized in the $CO_2$ absorber 13, wherein the $CO_2$ absorber 13. The $CO_2$ absorber 13 includes a $CO_2$-absorbing unit 13A for the absorption of $CO_2$ in a $CO_2$-containing flue gas with the $CO_2$-absorbent, a main water rinsing unit 13C that is provided on a gas flow downstream side of the $CO_2$-absorbing unit 13A and that uses rinsing water 20 to recover the accompanying $CO_2$-absorbent while cooling $CO_2$-removed flue gas with the rinsing water 20, a circulation line $L_1$ that supplies the rinsing water 20 containing the $CO_2$-absorbent recovered in a liquid reservoir 21 in the main water rinsing unit 13C from a top portion side in the main water rinsing unit 13C and that circulates the rinsing water, and a preliminary water rinsing unit 13B provided between the $CO_2$-absorbing unit 13A and the main water rinsing unit 13C. In the $CO_2$ recovery unit 10A, a portion 20a of the rinsing water 20 containing the $CO_2$-absorbent is withdrawn through the circulation line $L_1$, is supplied into the preliminary water rinsing unit 13B from the main water rinsing unit 13C side, and preliminarily rinses the $CO_2$-absorbent that contains $CO_2$ absorbed in the $CO_2$-absorbing unit 13A and accompanies the flue gas 11B, followed by the recovery of the $CO_2$-absorbent. The preliminary rinsing water obtained by the preliminary rinsing is allowed to meet with a $CO_2$-absorbent 12 while allowing the preliminary rinsing water to directly flow down on the $CO_2$-absorbing unit 13A side.

In the first embodiment, a portion 20a of the rinsing water 20 containing the $CO_2$-absorbent is withdrawn through the circulation line $L_1$. However, the present invention is not limited thereto, and another construction may also be adopted, in which a reservoir that stores a portion 20a of the rinsing water 20 containing the $CO_2$-absorbent separately through the circulation line $L_1$ is provided, and the portion 20a is withdrawn from the reservoir.

In the absorber 13, the $CO_2$-containing flue gas 11A is brought into countercurrent contact with, for example, the $CO_2$-absorbent 12 based on an alkanol amine, in the $CO_2$-absorbing unit 13A provided at the lower side of the $CO_2$ absorber 13. Thereby, $CO_2$ contained in the $CO_2$-containing flue gas 11A is absorbed in the $CO_2$-absorbent 12 by a chemical reaction ($R—NH_2+H_2O+CO_2 \rightarrow R—NH_3HCO_3$).

As a result, a $CO_2$-removed flue gas 11B that is passed through the $CO_2$-absorbing unit 13A and travels upward through the inside of the $CO_2$ absorber 13 is substantially free from $CO_2$.

Next, in the preliminary water rinsing unit 13B, the $CO_2$-removed flue gas 11B after the removal of $CO_2$ is brought into gas-liquid contact with a portion 20a of rinsing water 20 withdrawn from the main water rinsing unit 13C and rinsed, and rinse the $CO_2$-absorbent 12 accompanying the $CO_2$-removed flue gas 11B.

Here, the reason why the $CO_2$-absorbent 12 accompanies the $CO_2$-removed flue gas 11B will be described. The $CO_2$-containing gas 11A that travels upward through the inside of the $CO_2$-absorbing unit 13A within the absorber 13 is accompanied by water vapor in relation with a saturated vapor pressure at the temperature.

When the $CO_2$-removed gas containing the water vapor is brought into countercurrent contact with the $CO_2$-absorbent 12, a very small portion of the $CO_2$-absorbent 12 accompanies, as mist, a flue gas by entrainment, in relation with a saturated vapor pressure.

As a result, a very small amount of the $CO_2$-absorbent 12 is contained in the $CO_2$-removed flue gas 11B that has been passed through the $CO_2$-absorbing unit 13A.

In the main water rinsing unit 13C, rinsing water 20 that is condensed water is produced from water vapor that accompanies the flue gas by cooling of the $CO_2$-removed flue gas 11B, and the $CO_2$-absorbent 12 that accompanies the flue gas is dissolved, whereby a very small amount of the $CO_2$-absorbent 12 is contained in the rinsing water 20.

Therefore, in the first embodiment, at first in the preliminary water rinsing unit 13B, the $CO_2$-absorbent 12 contained in the $CO_2$-removed gas 11B is rinsed and removed with the preliminary rinsing water obtained by condensing and extracting excess water in the $CO_2$-removed flue gas 11B through cooling in the main water rinsing unit 13C.

Alternatively, a cooling unit 23 may be provided in a withdrawal line $L_2$ and a portion 20a of the rinsing water 20 is cooled to a predetermined temperature (for example, 40° C. or below).

Thereafter, a $CO_2$-removed flue gas 11C that has been passed through the preliminary water rinsing unit 13B goes upward through a chimney tray 16 towards the main water rinsing unit 13C side, and is brought into gas-liquid contact with rinsing water 20 supplied from a top side of the water rinsing unit 13C. Thereby, the $CO_2$-absorbent 12 that accompanies the $CO_2$-removed flue gas 11C is recovered through circulation rinsing.

In the main water rinsing unit 13C, the rinsing water 20 stored in the liquid reservoir 21 in the chimney tray 16 is circulated through a circulation line $L_1$ for circulation rinsing.

A cooling unit 22 is provided in the circulation line $L_1$ for cooling the water to a predetermined temperature (for example, 40° C. or below).

The $CO_2$-absorbent 12 that accompanies the $CO_2$-removed flue gas 11C can be further recovered and removed by the main rinsing with the rinsing water 20 circulated.

Thereafter, a flue gas 11D from which the $CO_2$-absorbent 12 has been removed is discharged to the exterior through a top 13a in the $CO_2$ absorber 13. Numeral 73 denotes a mist eliminator that captures mist contained in the gas.

Thus, in the first embodiment, the preliminary water rinsing unit 13B and the main water rinsing unit 13C are provided, and the $CO_2$-absorbent 12 dissolved in the condensed water that accompanies the $CO_2$-removed gases 11B and 11C is rinsed and removed in two stages. Accordingly, the $CO_2$-absorbent 12 that accompanies the $CO_2$-removed flue gases 11B and 11C can be reliably recovered and removed.

Consequently, the concentration of basic amine compounds that remain in and are released from the $CO_2$-absorbent-removed flue gas 11D that is to be released to the exterior can be further reduced.

The rich solution 12A with $CO_2$ absorbed therein is subjected to elevated pressure by a rich solvent pump 51 interposed in a rich solution supply pipe 50, is heated by the lean solution 12B regenerated in the absorbent regenerator 14 in a rich-lean solution heat exchanger 52, and is supplied towards the top side of the absorbent regenerator 14.

The rich solution 12A released from the top side of the regenerator 14 into the tower releases a major portion of $CO_2$ by heating with steam from the bottom of the tower. The $CO_2$-absorbent 12 from which a portion or a major portion of $CO_2$ has been released in the regenerator 14 is called "semi-lean solution." The semi-lean solution (not illustrated) turns to a lean solution 12B from which $CO_2$ has been substantially completely removed by the time when the semi-lean solution flows down to the bottom of the regenerator 14. The lean solution 12B is heated with a saturated steam 62 in a regeneration heater 61 interposed in a circulation line $L_{20}$.

On the other hand, a $CO_2$ gas 41 accompanied by steam that, in a regenerator 14, has diffused from the rich solution 12A and the semi-lean solution (not illustrated) is released from a top 14a of the regenerator 14.

The $CO_2$ gas 41 accompanied by steam is led out through a gas discharge line $L_{21}$, and the steam is condensed in a condenser 42 interposed in the gas discharge line $L_{21}$. Condensed water 44 is separated in a separation drum 43, and a $CO_2$ gas 45 is released to the outside of the system, followed by separate post treatment such as compression recovery.

The condensed water 44 separated in the separation drum 43 is supplied into the top of the absorbent regenerator 14 through a condensed water circulation pump 46 interposed in a condensed water line $L_{22}$.

A portion (not illustrated) of the condensed water 44 may be supplied into the circulation line $L_1$ of the rinsing water 20 containing the $CO_2$-absorbent for use in the absorption of the $CO_2$-absorbent 12 that accompanies the $CO_2$-removed flue gas 11C.

The regenerated $CO_2$-absorbent (lean solution 12B) is sent to the $CO_2$ absorber 13 side with a lean solution pump 54 through a lean solution supply pipe 53, and is circulated and utilized as the $CO_2$-absorbent 12 through circulation. In this case, the lean solution 12B is cooled to a predetermined temperature in a cooling unit 55, and is supplied into a $CO_2$-absorbing unit 13A through a nozzle 56.

Thus, the $CO_2$-absorbent 12 are included in a closed path through which the $CO_2$-absorbent 12 is circulated through the $CO_2$ absorber 13 and the absorbent regenerator 14, and the $CO_2$-absorbent 12 is reutilized in the $CO_2$-absorbing unit 13A of the $CO_2$ absorber 13. If necessary, the $CO_2$-absorbent 12 is supplied through a supply line not illustrated. If necessary, the $CO_2$-absorbent 12 is regenerated with a reclaimer not illustrated.

The $CO_2$-containing flue gas 11A supplied into the $CO_2$ absorber 13 is cooled with cooling water 71 in a cooling tower 70 provided on a former stage side, and is then introduced into a $CO_2$ absorber 13. In some cases, a portion of the cooling water 71 is also supplied, as rinsing water 20 for the $CO_2$ absorber 13, to the top 13a of the main water rinsing unit 13C, for use in rising of the $CO_2$-absorbent 12 that accompanies the $CO_2$-removed flue gas 11B. Numerals 72, 74, and 75 denote a circulation pump, a circulation line, and a cooler, respectively.

Thus, the $CO_2$-absorbent 12 that is utilized while circulating through the $CO_2$ absorber 13 and the absorbent regenerator 14 accompanies the $CO_2$-removed flue gas 11B. The emission of the $CO_2$ absorbent from the absorber 13 is prevented by, in the preliminary water rinsing unit 13B and the main water rinsing unit 13C, absorbing and removing the $CO_2$-absorbent 12 accompanying the $CO_2$-removed flue gases 11B and 11C with the rinsing water 20 through countercurrent contact between the $CO_2$-removed flue gases 11B and 11C and $CO_2$ removed therefrom and the rinsing water 20.

As described above, in the first embodiment, in addition to the conventional main water rinsing unit 13C using a circulation rinsing water, the preliminary water rinsing unit 13B is provided. Thus, the effect of recovering the $CO_2$-absorbent that accompanies the $CO_2$-removed flue gases 11B and 11C can be improved.

Specifically, in the main water rinsing unit 13C, circulation rinsing is carried out with the circulated rinsing water 20, and, at the same time, a portion 20a of the rinsing water 20 after use in the rinsing is withdrawn through a withdrawal line $L_2$ and is supplied into the preliminary water rinsing unit 13B. Thus, the portion 20a of the withdrawn rinsing water 20 has a low $CO_2$-absorbent concentration (for example, a few percent). Consequently, a high quality of rinsing in the preliminary water rinsing unit 13B is carried out.

Specifically, when only the main water rinsing unit 13C through which the rinsing water 20 is circulated is installed in a plurality of stages within the $CO_2$ absorber 13, a plurality of the circulation lines, the circulation pumps, and the chimney trays 16 in which the rinsing water is stored needs to be provided, resulting in increased installation and running cost.

By contrast, the preliminary water rinsing unit 13B uses an excess portion of the rinsing water 20 used in the main water rinsing unit 13C, and what is required in the supply amount is only to be regulated with a regulation valve 24. Thus, the preliminary water rinsing unit 13B may have a simple construction.

This is so because, in the main water rinsing unit 13C, the $CO_2$-removed flue gas 11C is cooled with the rinsing water 20 and gaseous water that accompanies the $CO_2$-removed flue gas 11C is condensed and becomes excess water, making it possible to use the excess portion in preliminary rinsing.

A chimney tray 16 that is a partition member is not provided between the preliminary water rinsing unit 13B and the $CO_2$-absorbing unit 13A. Thus, a portion 20a of the rinsing water after use in the preliminary rinsing directly meets with the $CO_2$-absorbent (lean solution 12A).

As a result, the preliminary rinsing water that has been used in the preliminary rinsing for the recovery of the $CO_2$-absorbent contains the $CO_2$-absorbent in a somewhat larger amount than a portion 20a of the rinsing water withdrawn through the circulation line $L_1$, contributing to the recovery of $CO_2$ in the $CO_2$-absorbing unit 13A.

Specifically, for example, the lean solution 12B of the $CO_2$-absorbent in the concentration of 30% meets with the rinsing water 20a containing the $CO_2$-absorbent in the concentration of a few percent+$\alpha$.

As a result, as compared to the case where the condensed water recovered in the rinsing unit is supplied to a bottom 13b side of the $CO_2$ absorber 13 in the prior art, the concentration is higher by a value corresponding to the recovery of the $CO_2$-absorbent in the preliminary water rinsing unit 13B, leading to an improvement in the effect of removing $CO_2$ contained in the $CO_2$-containing flue gas 11A in the $CO_2$-absorbing unit 13A.

Second Embodiment

Figure 2:
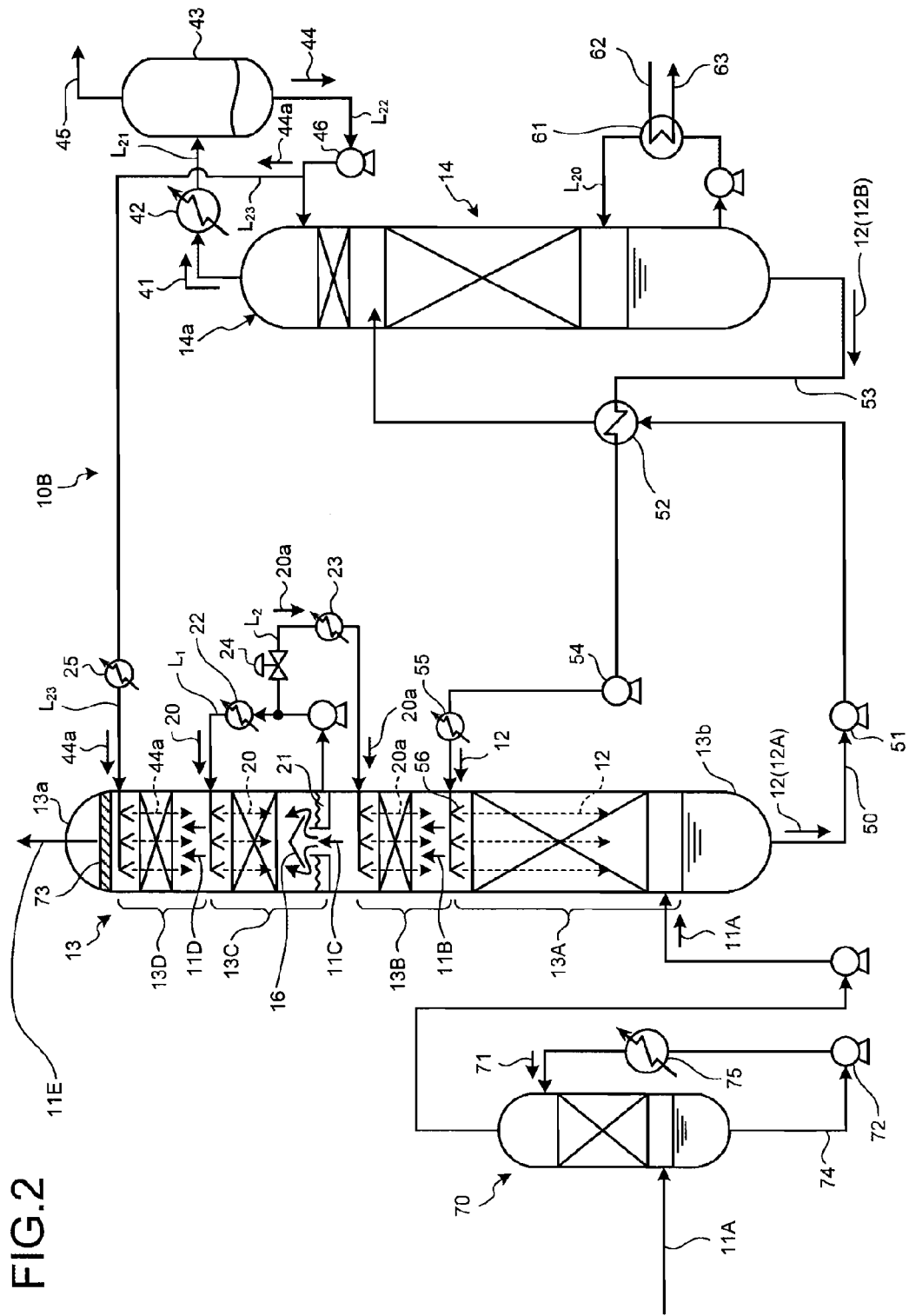
FIG. 2 is a schematic view of a $CO_2$ recovery unit according to a second embodiment.

A $CO_2$ recovery unit in another embodiment of the present invention will be described with reference to the accompanying drawings. FIG. 2 is a schematic view of a $CO_2$ recovery unit according to a second embodiment. The components same as those in the $CO_2$ recovery unit 10A in the first embodiment illustrated in FIG. 1 are denoted by the same reference characters, and the description thereof will not be repeated.

As illustrated in FIG. 2, in a $CO_2$ recovery unit 10B in the second embodiment, a finish water rinsing unit 13D is further provided on a gas flow rear stage side of a main water rinsing unit 13C in the $CO_2$ recovery unit 10A illustrated in FIG. 1 and performs finish rinsing with rinsing water 20 supplied from the exterior of the main water rinsing unit 13C. In the second embodiment, a portion 44a of the condensed water 44 separated from a $CO_2$ gas 41 accompanied by steam released to the exterior is supplied through a branched line $L_{23}$ from the top 14a of a regenerator 14 and is used as rinsing water in the finish water rinsing unit 13D.

A cooling unit 25 may be provided in the branched line $L_{23}$ and a portion 44a of the condensed water 44 may be cooled to a predetermined temperature (for example, 40° C. or below).

A portion 44a of the condensed water 44 is in a state separated from the $CO_2$ gas 41 accompanied by the steam released to the exterior from the regenerator 14. Accordingly, the condensed water 44 is substantially free from $CO_2$-absorbent, and, thus, high finish rinsing efficiency can be realized.

Alternatively, in addition to the portion 44a of the condensed water 44, ion exchanged water may be separately supplied as the finish rinsing water in the finish water rinsing unit 13D.

Thus, in the second embodiment, the concentration of the $CO_2$-absorbent diffused to the exterior from the top 13a of the absorber 13 can be further reduced by using, as a finish rinsing water, a liquid containing a gas accompanying substance such as the $CO_2$-absorbent at a low concentration, and bringing the finish rinsing water into gas-liquid contact with the $CO_2$-absorbent-removed flue gas 11D on the rearmost flow side (top 13a side) of the final stage in the water rinsing unit.

As a result, the concentration of basic amine compounds that remain in and are released from a $CO_2$-removed flue gas 11E released to the exterior can be further reduced as compared to the concentration of basic amine compounds in the first embodiment.

Third Embodiment

Figure 3:
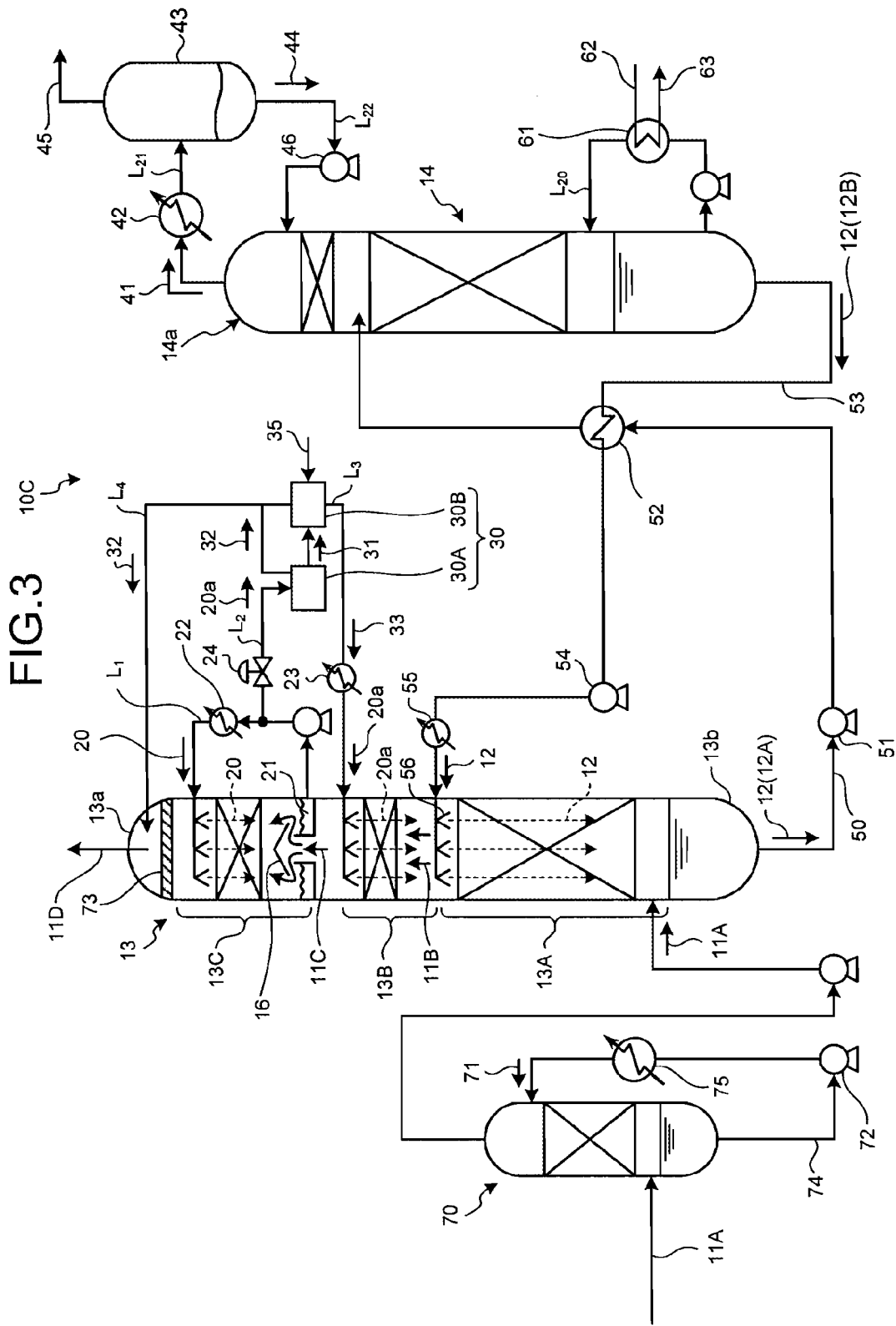
FIG. 3 is a schematic view of a $CO_2$ recovery unit according to a third embodiment.

A $CO_2$ recovery unit in a third embodiment of the present invention will be described with reference to the accompanying drawings. FIG. 3 is a schematic view of a $CO_2$ recovery unit according to the third embodiment. The components same as those in the $CO_2$ recovery unit 10A in the first embodiment illustrated in FIG. 1 are denoted by the same reference characters, and the description thereof will not be repeated.

As illustrated in FIG. 3, a $CO_2$ recovery unit 10C in the second embodiment has the same construction as that of the $CO_2$ recovery unit 10A illustrated in FIG. 1, except that the following elements are additionally provided: a withdrawal line $L_2$ that withdraws, as a withdrawn water, a portion 20a of rinsing water 20 containing a $CO_2$-absorbent 12 from the circulation line $L_1$ for the rinsing liquid 20 that is circulated through a main water rinsing unit 13C; a gas-liquid separator 30A that separates a gas component 32 from withdrawn liquid; a concentration tower 30B that concentrates the $CO_2$-absorbent 12 in the withdrawn liquid 20a to separate the gas component 32; an introduction line $L_3$ that introduces, as preliminary rinsing water, a concentrated solution 33 obtained by concentrating the $CO_2$-absorbent 12 into a preliminary water rinsing unit 13B; and a gas introduction line $L_4$ that introduces the separated gas component 32 into a top 13a side of an absorber 13. In the third embodiment, the gas-liquid separator 30A and a concentration tower 30B are included in a concentration unit.

In the gas-liquid separator 30A, the withdrawn liquid is at first diffused to separate liquid 31 from the gas component 32, and thus, the gas component 32 is separated from the withdrawn liquid.

The gas component 32 is a highly volatile substance such as ammonia contained in the $CO_2$-absorbent 12 and is discharged to the gas introduction line $L_4$.

The liquid 31 from which the gas component 32 has been separated in the gas-liquid separator 30A is introduced into the concentration tower 30B.

Air 35 is blown into the concentration tower 30B, and the gas component 32 remaining in the liquid 31 is further withdrawn.

If necessary, a line (not illustrated) that recovers volatile substances in a liquid phase and discharges the recovered liquid phase is provided in the concentration tower 30B.

Consequently, volatile substances, for example, ammonia, can be removed from the liquid 31 to give the concentrated solution 33.

In the third embodiment, the concentrated solution 33 from which ammonia or the like has been removed is supplied through the supply line $L_3$ towards the preliminary water rinsing unit 13B side and is used as preliminary rinsing water.

Thus, a concentration unit 30 is provided in a withdrawal line $L_2$ in the main water rinsing unit 13C to give the concentrated solution 33 obtained by separating steam-containing volatile substances from the rinsing liquid. Further, since the concentrated solution 33 free from volatile substances is used as the preliminary rinsing water, volatile components such as ammonia can be absorbed and removed with the preliminary rinsing water. Consequently, the concentration of volatile accompanying substance components in the $CO_2$-removed flue gas 11C introduced into the main water rinsing unit 13C can be reduced.

As a result, the concentrations of basic amine compounds and volatile substances that remain in and are released from the $CO_2$-absorbent-removed flue gas 11D released to the exterior can be further reduced as compared to that in the first embodiment.

Test Example 1

A test that examines the effect of the first embodiment of the present invention was carried out.

Specifically, a flue gas containing 14% of carbon dioxide was supplied at 200 $Nm^3$/hr into the $CO_2$-absorbing unit 13A in the absorber 13, and was brought into countercurrent contact with a basic amine solution ($CO_2$-absorbent) to absorb carbon dioxide.

In this Test Example, a preliminary water rinsing unit 13B was provided on a rear flow (upper portion) side of the $CO_2$-absorbing unit 13A.

An excess portion of the rinsing water in the main water rinsing unit 13C was withdrawn for use as the rinsing water in the preliminary water rinsing unit 13B and was brought into countercurrent contact with the flue gas to directly flow down to the $CO_2$-absorbent. In the main water rinsing unit 13C, the rinsing water was brought into countercurrent contact with the gas at a liquid/gas ratio of 4 $L/Nm^3$, and the gas was passed through a demister 73 disposed at the outlet.

Figure 4:
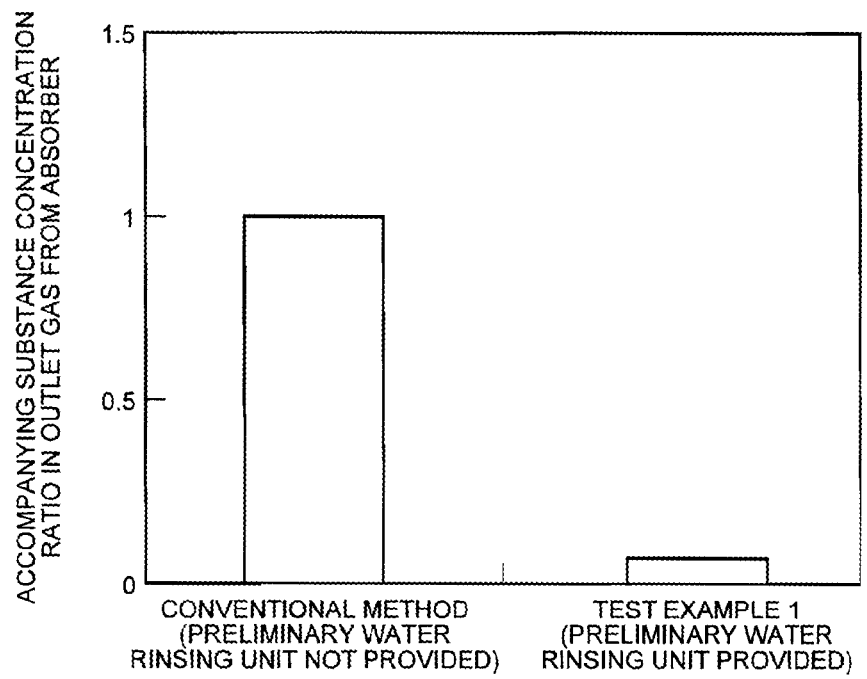
FIG. 4 is a graph showing a comparison of the concentration of accompanying substances in an outlet gas of an absorber in Test Example 1.

The results are shown in FIG. 4. FIG. 4 is a graph illustrating a comparison of the concentration of accompanying substances in outlet gas from the absorber in Test Example 1. In FIG. 4, the left graph illustrates results of a conventional method in which the preliminary water rinsing unit is not provided, and the right graph illustrates a method in which the preliminary water rinsing unit is provided.

When the preliminary water rinsing unit was provided as in Test Example 1, the concentration ratio of accompanying substances in the outlet gas from the absorber ($CO_2$-absorbent-removed flue gas 11D) was reduced to $\frac{1}{10}$.

Test Example 2

A test that examines the effect of the second embodiment of the present invention was carried out.

Specifically, a flue gas containing 14% of carbon dioxide was supplied at 200 $Nm^3$/hr into the $CO_2$-absorbing unit 13A in the absorber 13, and was brought into countercurrent contact with a basic amine solution ($CO_2$-absorbent) to absorb carbon dioxide.

In the Test Example, a preliminary water rinsing unit 13B was provided on a rear flow (upper portion) side of the $CO_2$-absorbing unit 13A, and a finish water rinsing unit 13D was further provided on a rear flow (upper portion) side of the main water rinsing unit 13C.

An excess portion of the rinsing water in the main water rinsing unit 13C was withdrawn for use as the rinsing water in the preliminary water rinsing unit 13B, and was brought into countercurrent contact with the flue gas to directly flow down to the $CO_2$-absorbent 12. The rinsing water was then brought into countercurrent contact with the gas at a liquid/gas ratio of 4 $L/Nm^3$. In the finish water rinsing unit 13D, a portion of reflux water in the regenerator was introduced and was brought into countercurrent contact with the gas to directly flow down to the rinsing liquid in the main water rinsing unit 13C. The gas was then passed through a demister 73 disposed at the outlet.

Figure 5:
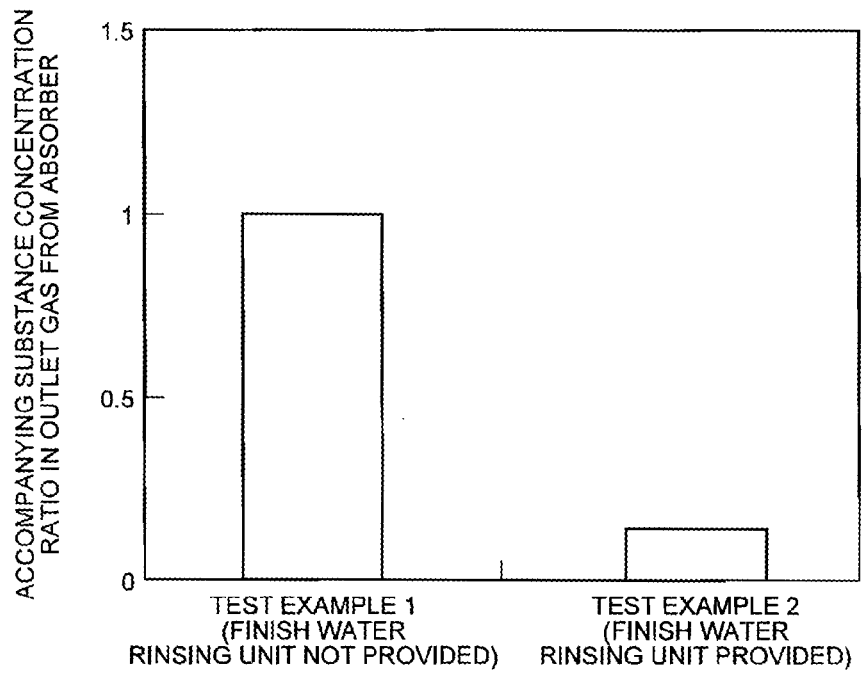
FIG. 5 is a graph showing a comparison of the concentration of accompanying substances in an outlet gas of an absorber in Test Example 2.

The results are shown in FIG. 5. FIG. 5 is a graph illustrating a comparison of the concentration of accompanying substances in outlet gas from the absorber in Test Example 2. In FIG. 5, the left graph illustrates the results of Test Example 1 where the preliminary water rinsing unit was provided while the finish water rinsing unit was not provided. The right graph illustrates a method in which the preliminary water rinsing unit and the finish water rinsing unit were provided before and after the main water rinsing unit.

When the preliminary water rinsing unit and the finish water rinsing unit were provided before and after the main water rinsing unit as in Test Example 2, the concentration ratio of accompanying substances in outlet gas from the absorber ($CO_2$-absorbent-removed flue gas 11E) was reduced to 1/10. Thus, the concentration ratio was reduced to 1/100, as compared to that in the conventional method in Test Example 1 (preliminary water rinsing unit and finish water rinsing unit are not provided).

Test Example 3

A test that examines the effect of the third embodiment of the present invention was carried out.

Specifically, a flue gas containing 14% of carbon dioxide was supplied at 200 $Nm^3/hr$ into the $CO_2$-absorbing unit 13A in the absorber 13, and was brought into countercurrent contact with a basic amine solution ($CO_2$-absorbent) to absorb carbon dioxide.

In this Test Example, a preliminary water rinsing unit 13B was provided on a rear flow (upper portion) side of the $CO_2$-absorbing unit 13A, and a concentration unit 30 was further provided on the withdrawal line $L_2$ in the main water rinsing unit 13C.

An excess portion of the rinsing water in the main water rinsing unit 13C was withdrawn for use as the rinsing water in the preliminary water rinsing unit 13B, and was brought into countercurrent contact with a flue gas to directly flow down to the $CO_2$-absorbent. The rinsing water was then brought into countercurrent contact with the gas at a liquid/gas ratio of 4 $L/Nm^3$ in the main water rinsing unit 13C, and the gas was passed through a demister 73 disposed at the outlet.

Figure 6:
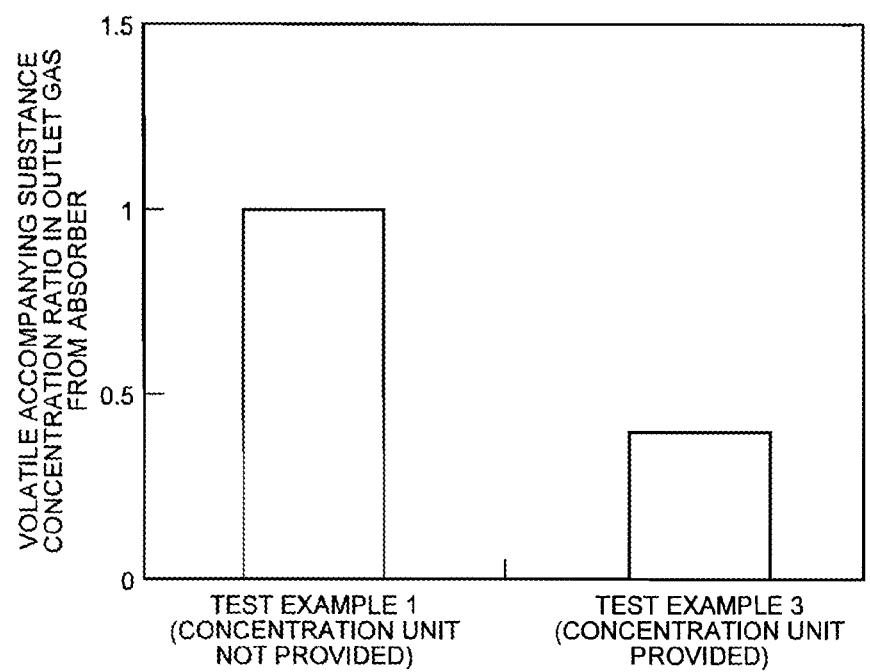
FIG. 6 is a graph showing a comparison of the concentration of volatile substances in an outlet gas of an absorber in Test Example 3.

The results are shown in FIG. 6. FIG. 6 is a graph illustrating a comparison of the concentration of volatile substances in outlet gas from the absorber in Test Example 3. In FIG. 6, the left graph illustrates the results of Test Example 1 where the concentration unit was not provided, and the right graph illustrates a method in which the concentration unit was provided.

When the concentration unit was provided as in Test Example 3, the concentration ratio of volatile accompanying substances in outlet gas from the absorber ($CO_2$-absorbent-removed flue gas 11D) was reduced to 2/5.

REFERENCE SIGNS LIST 10A to 10C $CO_2$ recovery unit
11A $CO_2$-containing gas
12 $CO_2$-absorbent
12A Rich solution
12B Lean solution
13 $CO_2$ absorber (absorber)
13A $CO_2$-absorbing unit
13B Preliminary water rinsing unit
13C Main water rinsing unit
13D Finish water rinsing unit
14 Absorbent regenerator (regenerator)
20 Rinsing water
20a Portion of rinsing water

The invention claimed is:

1. A $CO_2$ recovery unit comprising:
a $CO_2$ absorber configured to bring a $CO_2$-containing flue gas containing $CO_2$ into contact with a $CO_2$ absorbent to remove $CO_2$; and
a $CO_2$-absorbent regenerator configured to separate $CO_2$ from the $CO_2$ absorbent that has absorbed $CO_2$ therein, to regenerate the $CO_2$ absorbent and to separate condensed water from $CO_2$ gas accompanied by steam released therefrom;
a lean solution obtained by removing $CO_2$ in the absorbent regenerator being reutilized in the $CO_2$ absorber, and the condensed water being used in the $CO_2$ absorber,
the $CO_2$ absorber comprising:
a $CO_2$-absorbing unit that absorbs $CO_2$ in a $CO_2$-containing flue gas with the $CO_2$ absorbent;
a preliminary water rinsing unit that is provided on a gas flow downstream side of the $CO_2$-absorbing unit and that preliminarily rinses decarbonated flue gas flowing from the $CO_2$-absorbing unit;
a main water rinsing unit that is provided on the gas flow downstream side of the preliminary water rinsing unit and that rinses decarbonated flue gas flowing from the preliminary water rinsing unit;
a circulation line that is configured to circulate rinsing water in the main water rinsing unit;
a withdrawal line that is branched from the circulation line to withdraw a portion of the rinsing water circulating in the main water rinsing unit;
a cooling unit that is provided on the withdrawal line and is configured to cool the portion of the withdrawn rinsing water; and
a finish water rinsing unit that is provided on a rear stage side of the gas flow in the main water rinsing unit and is configured to finish rinse the decarbonated flue gas with the condensed water, wherein
the main water rinsing unit is configured to rinse the decarbonated flue gas while cooling with the rinsing water circulating in the main water rinsing unit via the circulating line to recover the $CO_2$ absorbent by which the decarbonated flue gas is accompanied; and
the preliminary water rinsing unit is configured to preliminarily rinse the decarbonated flue gas with the rinsing water withdrawn via the withdrawal line to recover the $CO_2$ absorbent by which the decarbonated flue gas is accompanied, and allow the preliminary rinsing water obtained by the preliminary water rinsing to directly flow down through the $CO_2$-absorbing unit toward a lower side thereof, meet with the $CO_2$ absorbent through the $CO_2$-absorbing unit, and come into countercurrent contact with the flue gas.

2. The $CO_2$ recovery unit according to claim 1, further comprising a concentration unit that removes a volatile substance contained in a portion of the rinsing water withdrawn from the main water rinsing unit,
wherein concentrated water from which the volatile substance has been removed is supplied, as rinsing water, into the preliminary water rinsing unit.

3. The $CO_2$ recovery unit according to claim 1, wherein the main water rinsing unit is provided in a plurality of stages.

4. A method for recovering $CO_2$, using a $CO_2$ absorber configured to bring a $CO_2$-containing flue gas into contact with a $CO_2$ absorbent to remove $CO_2$, and a $CO_2$-absorbent regenerator configured to separate $CO_2$ from the $CO_2$ absorbent that has absorbed $CO_2$, to regenerate the $CO_2$ absorbent and to separate condensed water from $CO_2$ gas accompanied by steam released therefrom, a lean solution obtained by removing $CO_2$ in the absorbent regenerator being reutilized in the $CO_2$ absorber, and the condensed water being used in the $CO_2$ absorber, the method comprising:
rinsing decarbonated flue gas in a main rinsing unit while cooling with circulating rinsing water to recover the $CO_2$ absorbent by which the decarbonated flue gas is accompanied;

finish rinsing the decarbonated flue gas with the condensed water;
withdrawing a portion of the circulating rinsing water;
cooling the portion of the circulating rinsing water; and
preliminarily rinsing decarbonated flue gas prior to the rinsing in the main rinsing unit with the rinsing water withdrawn to recover the $CO_2$ absorbent by which the decarbonated flue gas is accompanied, and allowing the preliminary rinsing water obtained by the preliminary rinsing to directly flow down through a $CO_2$-absorbing unit toward a lower side thereof, meet with the $CO_2$ absorbent through the $CO_2$-absorbing unit, and come into countercurrent contact with the flue gas.

5. The method for recovering $CO_2$ according to claim 4, wherein
concentrating the rinsing water withdrawn by removing a volatile substance therein to give concentrated water, and
using the concentrated water as rinsing water for preliminary rinsing.

* * * * *